May 5, 1931. J. BADEKER 1,803,990
METALLIC ROD PACKING
Filed Feb. 3, 1930  3 Sheets-Sheet 1
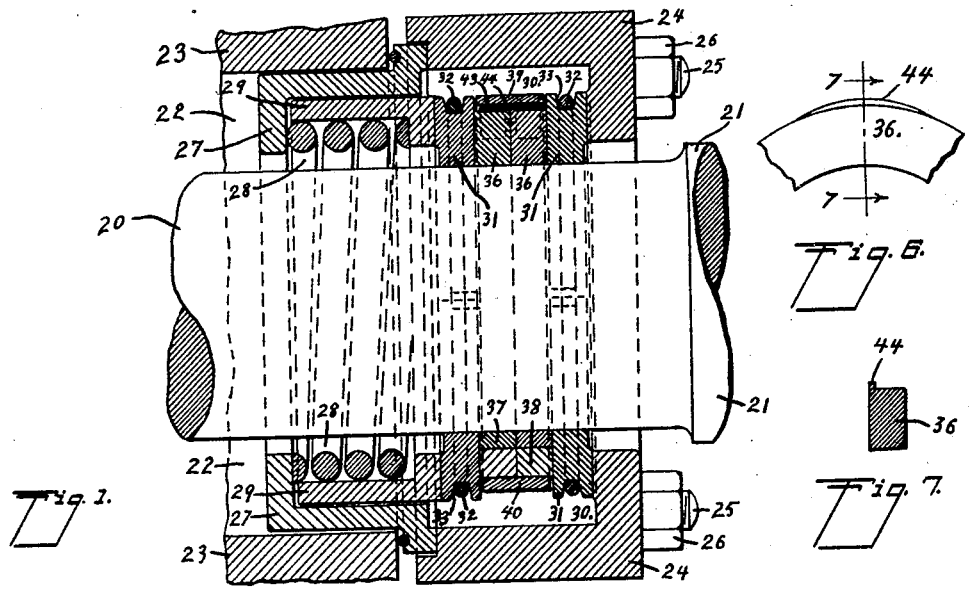
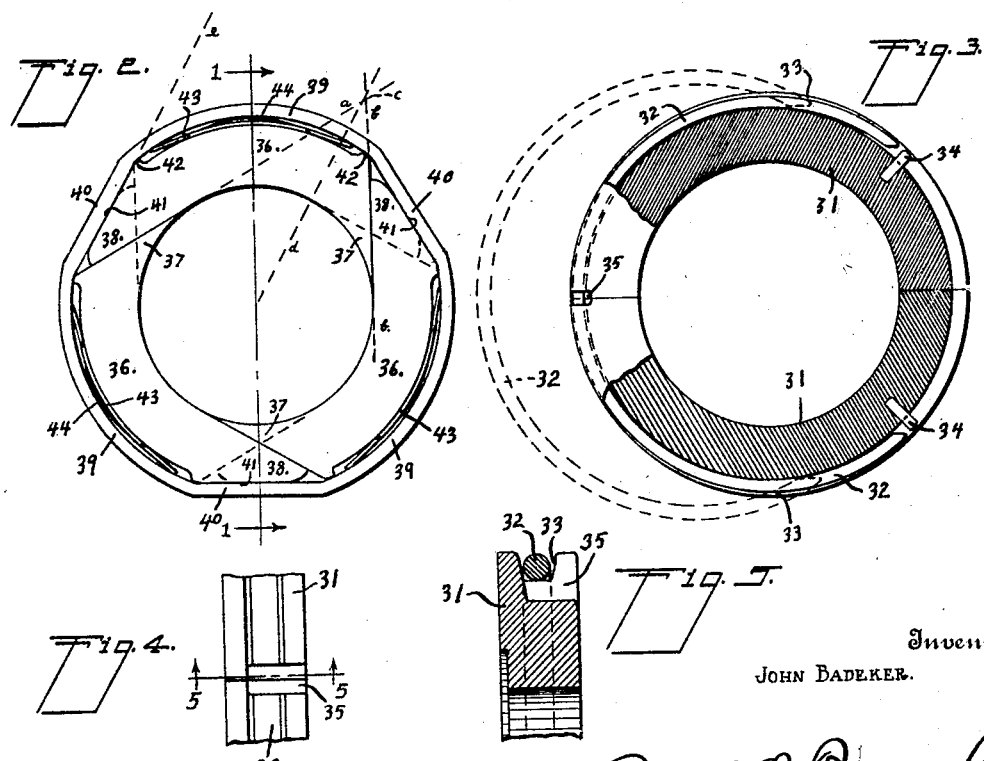
Inventor
JOHN BADEKER.
By David O. Barnell
Attorney May 5, 1931.  J. BADEKER  1,803,990
METALLIC ROD PACKING
Filed Feb. 3, 1930  3 Sheets-Sheet 2
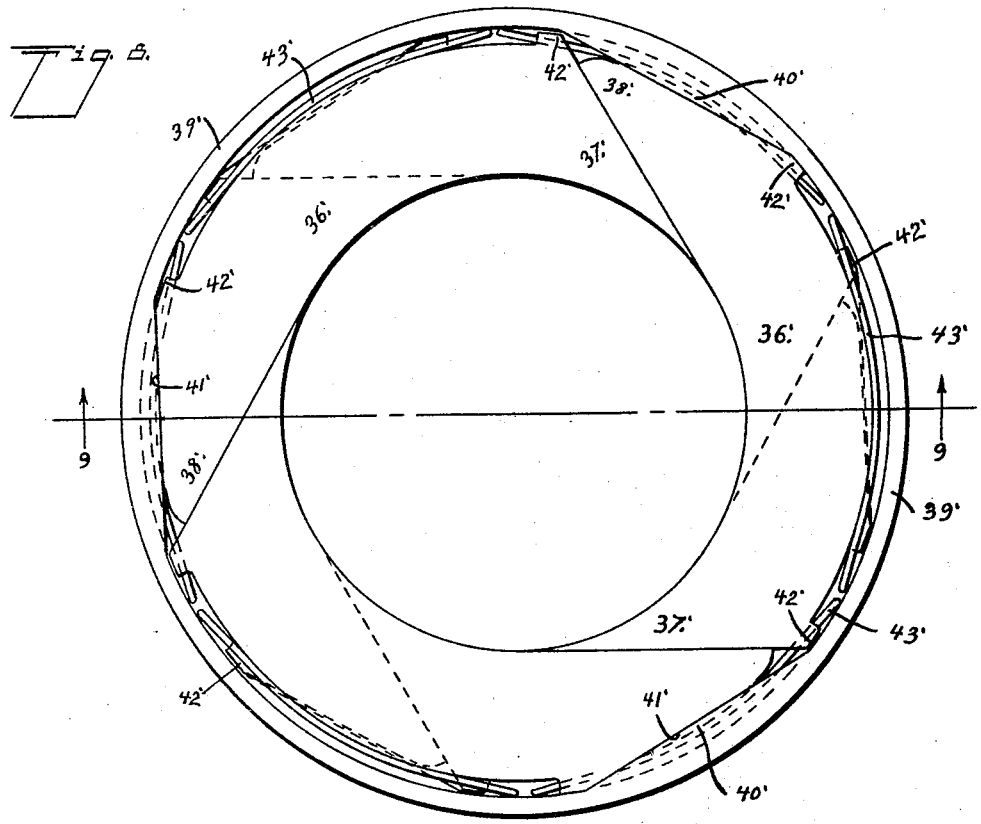
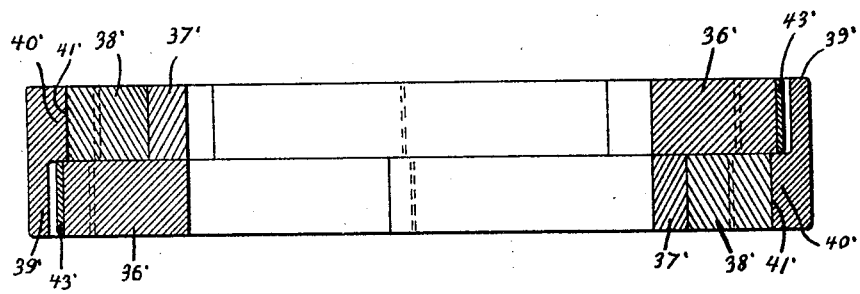
John Badeker, Inventor
By David O. Barnell.
Attorney

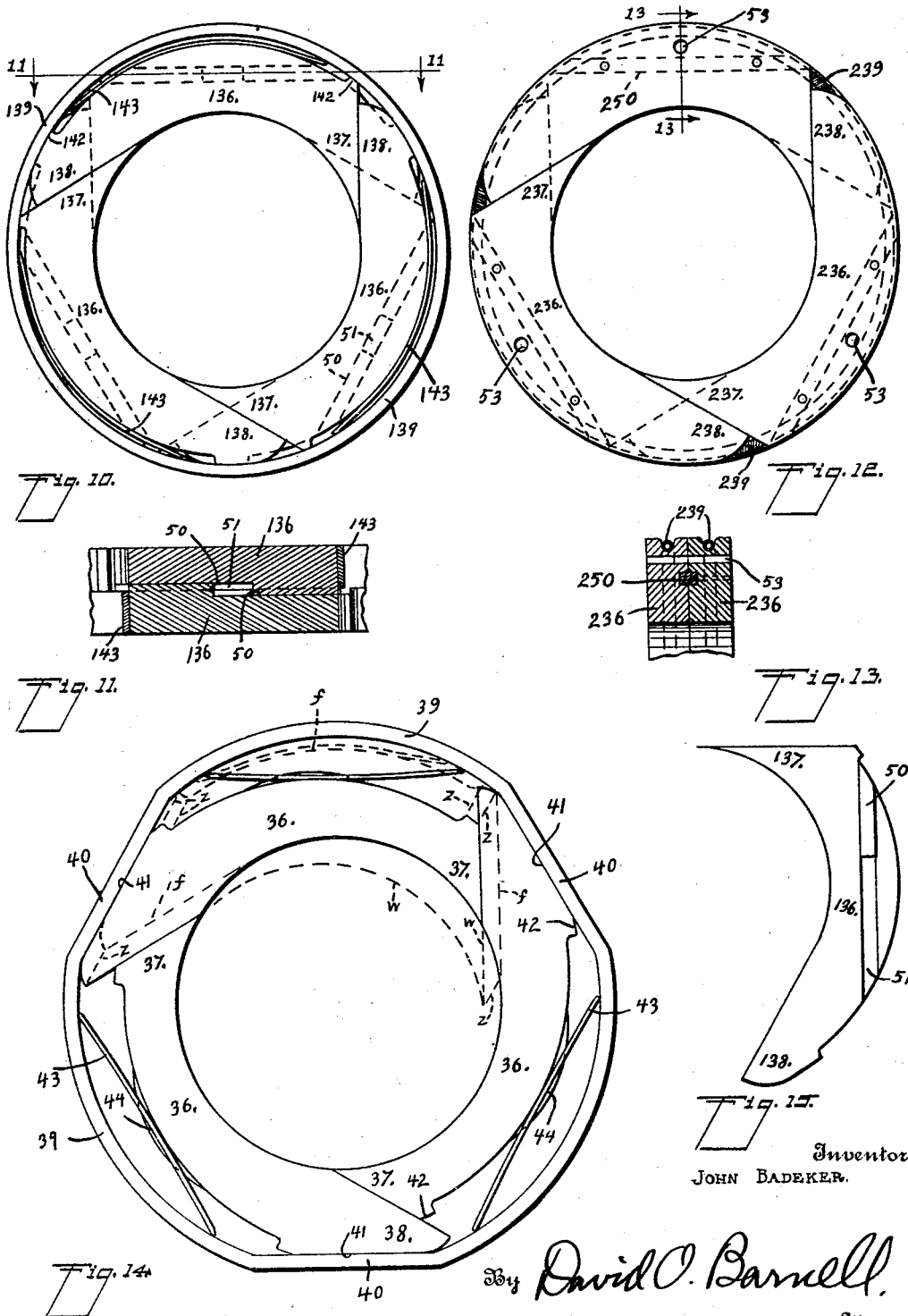

Patented May 5, 1931

1,803,990

UNITED STATES PATENT OFFICE

JOHN BADEKER, OF CHICAGO, ILLINOIS

METALLIC ROD-PACKING

Application filed February 3, 1930. Serial No. 425,486.

My invention relates to metallic packing for use on reciprocating cylindrical rods, such as the piston-rods of locomotives. It is the object of my invention to provide a packing of this type especially adapted for use in railway service, wherein the packing is subjected to exceptionally severe operating conditions; the latter including the deposit, within the glands and about the packing, of cementitious matter which is of a plastic and adhesive consistency in early stages of its formation and which later assumes a flinty harness; and including also lateral movements of the rod, made with such rapidity as to cause separation of the rods from the parts of the packing at the side from which the movement of the rod occurs, unless said parts are positively caused to partake of the lateral movement. My invention provides metallic packing wherein there are no interstices or clearance-spaces between the segments or parts, in which the cementitious foreign matter may accumulate and harden to prevent the normal closing of the packing-rings to compensate wear at the bore, and wherein all parts of the packing are positively caused to partake of any lateral movements of the rod, whereby to prevent momentary separation of the parts to form openings through which leakage may occur and in which foreign matter may become entrapped and subsequently cause leakage and abnormal wear. My invention also provides improved means whereby relative circumferential movement of adjoining packing-rings may be prevented, and the rings caused to remain permanently in positions at which their joints are not coincident at the surface of the rod.

In the accompanying drawings, Fig. 1 is a longitudinal section of a rod-packing assemblage embodying my invention, Fig. 2 is a front view of the carrier and packing-rings, Fig. 3 is a partial transverse section and partial elevation of one of the guard-rings, Fig. 4 is a partial side view of the guard-ring, Fig. 5 is a section of the guard-ring on the line 5—5 of Fig. 4, Fig. 6 is a detail front view of a portion of one of the segments of a packing-ring, Fig. 7 is a detail section on the line 7—7 of Fig. 6, Fig. 8 is a front view of a slightly modified form of the carrier-ring, showing the packing-rings therein, Fig. 9 is a section on the line 9—9 of Fig. 8, Fig. 10 is a front view showing a further modification of the packing-rings and carrier-ring, Fig. 11 is a detail section on the line 11—11 of Fig. 10, Fig. 12 is a front view showing a further modification of the packing-rings, Fig. 13 is a transverse section on the line 13—13 of Fig. 12, Fig. 14 is a front view showing the relation of a packing-ring and the carrier-ring, of the type shown in Figs. 1 and 2, when the packing-ring has become worn, and Fig. 15 is a front vew of a single segment of a packing-ring of the form shown in Fig. 10.

Referring to Fig. 1, there is represented a piston-rod 20 having the usual enlarged end-portion 21 for connection with its cross-head, said rod passing through the stuffing-box 22 in the cylinder-head 23. A gland 24 is removably secured to the head 23 by means of stud-bolts 25 and nuts 26. A cup-ring 27 has an outer flange clamped between the gland and cylinder-head, and extends into the stuffing-box, the inner portion of said ring forming a seat for the follower-spring 28. The follower 29 fits slidably within the cup-ring, a portion thereof fitting about the spring 28, and the spring engaging a flange at the outer end thereof to press the follower yieldingly toward the packing within the gland. The openings through the gland, follower, follower-spring and cup-ring are normally alined axially with the rod 20, and are of such diameter as to allow the enlarged end 21 of the rod to pass through them, thereby enabling the assembling of said parts by passing them longitudinally over said enlarged end of the rod.

The packing-rings are disposed within the gland-chamber 30 between a pair of guard-rings 31, the inner guard-ring adjoining the end of the follower, and the outer guard-ring adjoining the inner face of the gland and forming fluid-tight contact therewith. Each guard-ring is divided diametrically, or on an axial plane, into two symmetrical parts, and the bore thereof is such as to fit loosely upon the rod, without forming fluid-tight contact therewith. The symmetrical halves of each guard-ring are held together by a C-shaped spring 32 disposed in a peripheral groove 33 intermediate the sides of the ring, there being pins 34 extending into the groove at the ends of the spring, whereby to center the same relatively to the joints between the halves, as shown in Fig. 3. The C-spring is placed upon or removed from the guard-ring by forcing the spring toward or from the ring so that the spring-ends slide over the opposite crests of the embraced portion thereof, the spring being thereby expanded and the ends spread apart to the diameter of the bottom of the groove 33, as shown in dotted lines in Fig. 3. To facilitate removal of the C-spring from the guard-ring, the latter has recesses 35 formed therein at the joint adjoining the middle portion of the spring, said recesses extending in from one side of the spring and being deeper than the groove 33, as shown in Figs. 4 and 5, whereby a hook may be engaged beneath the spring for pulling it off the ring. The C-spring is preferably so formed that when it is in place upon the guard-ring it will engage the bottom of the groove 33 substantially at diametrically opposite points midway between the ring-joints, whereby the spring-pressure will be equally divided between said joints, the remaining portions of the spring not pressing upon the ring but lying within the groove closely enough to prevent relative lateral displacement of the ring-halves.

The packing-rings provided by my invention are of the type wherein each ring is formed by a plurality of similar segments, each having flat parallel side-faces, and having plane end-faces extending substantially tangent to the bore of the ring, whereby each segment has a tapering or wedge-shaped inner end portion lying between the bore of the ring and one tangential end-face, and an undercut outer end portion which overlaps the tapering inner end portion of the next adjoining segment of the ring. I prefer, ordinarily, to form each packing-ring of three segments, although a larger number of segments may be employed if desired. By the use of two adjoining rings of this character, arranged so that their tangential joints are not coincident longitudinally of the rod, the circumferential extent of the rod-surface with which each segment of the packing is required to maintain contact is so small the fluid-tight engagement with the rod is insured, provided that the closing movements of the segments are so guided and controlled as to maintain symmetry of each ring about the rod, and provided also that the joints of the two rings are maintained in non-coinciding relation longitudinally of the rod-surface. My invention provided for the maintenance of such relations, as follows:

Referring particularly to Figs. 1 and 2, the pointed inner end portions of the segments 36 are indicated at 37, and the overlapping outer end portions of the segments are shown at 38. The pair of rings formed by said segments are inclosed peripherally by a carrier-ring 39 of which the width or axial dimension is slightly less than the combined thickness of the packing-rings, so that the latter receive the entire follower-pressure between the inner and outer guard-rings. The carrier-ring has flat chordal portions 40 adjoining, respectively, the outer end portions 38 of the packing-segments, and the latter have flat outer guide-faces 41 which contact slidably with the inner sides of said chordal portions 40.

The peripheral portions of the segments 36, adjacent to the arcuate portions of the carrier-ring, are originally concentric therewith and are maintained in spaced relation thereto by terminal lugs 42, whereby to enable insertion of flat springs 43 between the segments and carrier-ring. Said springs 43 are so formed that they tend to bow inwardly, whereby the ends of each spring are caused to engage the carrier-ring, while the middle portion of the spring presses inwardly upon the respective segment. The width of the springs 43 is slightly less than the thickness of the packing-rings, and for convenience in assembling the parts, each segment may be provided, intermediate the terminal lugs 42, with a narrow crescent-shaped lug 44, best shown in Figs. 6 and 7, said lugs 44 being at the adjoining sides of the packing-rings and serving to limit the depth to which the springs may be inserted from the open sides of the carrier-ring, whereby the springs for one of the packing-rings are prevented from overlapping the other packing-ring. As shown in Fig. 2, the tangential joints of the two packing-rings extend in opposite circumferential direction about the rod, so that although the chordal portions 40 of the carrier-ring are engaged by the guide-faces 41 of the segments of both packing-rings, the inner ends of the tangential joints of the two rings are interspaced circumferentially of the rod.

The guide-face 41 of each segment is so related to the tangential joint-faces of the respective segment as to be substantially parallel with a radial plane bisecting the dihedral angle between the joint-faces, and thus passing through the center of the rod-engaging surface of the segment. The described relation of the faces will be apparent from Fig. 2, wherein the dotted lines $a$ and $b$ indicate the dihedral angle formed by extending the planes of the joint-faces of one of the segments to a point of intersection $c$, the line $d$ indicates the bisecting radial or median plane, and the line e shows the plane of the guide-face 41 of the segment.

The closing of the packing-ring to compensate wear at the bore thereof, is effected by translatory movement of each segment in the direction of the guide-face 41 thereof, or, taking for example the upper segment shown in Fig. 2, every portion of the segment will move in a path parallel with the lines d and e. The movement of the segments in closing upon the rod will be clearly apparent from Fig. 14, in which there is shown in full lines the position and form of the segments after maximum wear of the packing. In said Fig. 14, the dotted lines f show the original form and position of one of the segments, the dotted lines w show the outline of that portion of the segment which has been worn away, and the lines z show the paths of movement of various points on the segment, all of said paths being parallel with the guide-face 41. It will be noted that when the segments of the ring have closed to the positions shown in Fig. 14, further closing movement is prevented by the engagement of the end-portions 38 with the arcuate portions of the carrier-ring, thus establishing a definite limit of wear of the packing.

It will also be noted that the chordal portions of the carrier-ring serve to limit circumferential shifting of the springs 43, and prevent said springs becoming displaced to positions at which they will not suitably engage the segments near the central parts of their arcuate peripheral portions.

The engagement between the guide-faces of the segments and the chordal portions of the carrier-ring serves, of course, to prevent relative circumferential movement of the two packing-rings, and preserves the interspaced or non-coinciding relation of their tangential joints.

In the modified structure shown in Figs. 8 and 9, the tangential joints of both packing-rings extend in the same direction about the rod, and circumferential interspacing of the joints is maintained by the use of separate circumferentially interspaced chordal portions 40' on the carrier-ring 39', said chordal portions 40' being half the width of the carrier-ring. The outside of the carrier-ring 39' is circular in form, not being flattened at the chordal portions as is the ring 39, and the ring 39' is preferably formed by casting, whereas the ring 39 may be produced by swaging a circular ring, or short section of cylindrical tubing, to form the chordal portions thereon.

The described forms of my improved metallic rod-packing are especially adapted for railway service, in which failure of packing of the forms heretofore in use frequently results from the following conditions: In the new and high-powered locomotives now coming into use, the pressure and superheating of steam are greater than have been employed formerly, and the packing is therefore subjected to higher temperatures and greater pressures than heretofore. One effect of the higher temperatures is to produce rapid weaking and deterioration of springs used in connection with the packing, especially of springs which have a large surface area proportional to the volume of material therein. In the operation of heavy trains on railways which have steep grades, it is often necessary for the engineer, when going down grades, to completely close the steam-throttle in order to secure a braking effect from the engine-cylinders. When this is done, suction is produced in the cylinders, which at each stroke of the pistons away from the stuffing-boxes tends to cause air to be drawn into the cylinder through the stuffing-boxes and glands, and when the follower-pressure is insufficient to hold the packing in place against the gland, in opposition to the cylinder-suction, air will be admitted to the cylinder, carrying with it whatever dust, sand or other solids that may be entrained therewith. In addition to the foregoing, a further and more serious fouling of the cylinders occurs by reason of suction in the cylinders during times when the exhaust valves are open. In this event, smoke, ashes and cinders are drawn into the cylinders through the exhaust-passages and exhaust-nozzle, from the smoke-box of the locomotive. Some of said materials are immediately blown out of the cylinders by the compression produced therein near the ends of the exhaust strokes of the pistons, but portions of such materials remain within the cylinders and are not so ejected. These foreign materials, together with the boiler-sediment carried into the cylinders with the steam, accumulate in the gland and about the packing, forming a cementitious mass which is initially plastic and adhesive in consistency, and eventually hardens into a solid mass or layer of refractory material which is strongly adherent to the exposed surfaces of the packing and other parts within the gland and stuffing-box. In packing of the types which have openings or clearance-spaces between the segments, the accumulation of the solidified or hardened cementitious material in such spaces will prevent the proper closing of the packing, and when the accumulation of such material adjoins the rod the abrasive character of the material causes excessive wear and scoring of the rod. In addition to the conditions last mentioned, a temporary failure of lubrication, such as may result from boiler-foaming and the carrying of water into the cylinders, will cause the packing to be heated by its frictional contact with the dry unlubricated rod, thus producing a temperature greater than the normal high temperature of the superheated steam, and the excessive heat may cause such softening and distortion of the packing that the same will not thereafter close properly, even though lubrication of the rod is resumed. In nearly all locomotives the fit of the cross-heads in their guides, and of the pistons within the cylinders, is loose enough to permit lateral movements of considerable extent to be made by said parts and the piston-rods which connect them, and when operating at high speed these lateral movements of the piston-rods are made with great rapidity. To accommodate the lateral movements of the rods, suitable clearance is provided within the glands, about the packing-rings and guard-rings, to allow the same to partake of said movements. During the rapid lateral movement of a rod, however, there is an inertial tendency for the parts of the packing structure, at the side from which the rod is moving, to lag and become separated from the rod, and this tendency is increased and aggravated by cohesion between the contacting surfaces of the guard-rings, follower and gland, when the plastic and adhesive cementitious material above mentioned is present in appreciable quantities.

In my improved packing, the C-springs which hold together the halves of the guard-rings may be of such size or thickness that they will not be subject to rapid deterioration by heat or corrosion and will retain substantially normal strength and resilience for an extended period of use. The effective action of said springs cannot be prevented by accumulation upon and about the same of the hard cementitious materials above mentioned, which quickly render ineffective the annular coil springs commonly used for this purpose, so that the rapid lateral movements of the rod and the cohesion of the guard-rings to the engaged faces of the glands may cause opening of the joints and leakage through said rings.

In the described packing embodying my invention, there are no openings or clearance-spaces in which accumulation and hardening of the cementitious material may occur, to interfere with the normal closing of the packing-rings, or to cause abrasion of the rod. The segments of the packing-rings are supported rigidly by the chordal portions of the carrier-ring, which are constantly in contact with the guide-faces of the segments so that when sudden lateral movements of the rod occur all parts of the packing are forced to partake equally in said movements. The closing of the segments upon the rod to compensate wear is not dependent upon the springs 43, the force effective to cause closing of the segments being principally that of the steam-pressure within the gland, and the springs being employed merely to keep the segments in normal position during absence of steam-pressure in the gland. Thus weakening, or even complete failure, of said springs 43 will not disable the packing or cause more than momentary leakage thereof. The form of the packing-segments is such that deformation thereof such as to prevent normal closing movements, cannot occur by reason of excessive heat produced by friction at the rod-engaging surfaces, and lack of proper lubrication of the rod will result merely in causing abnormal wear of the packing. By the provision of means definitely limiting wear of the packing, as hereinbefore mentioned, it is impossible to continue use of the packing beyond its normal period of wear, or until the segment-springs come into contact with the rod to score and abrade the same, as sometimes occurs with packing not having such wear-limiting structure.

The modified form of my packing shown in Figs. 10, 11 and 15, is adapted for use with steam-pressures and under temperature conditions permitting the packing-rings to be made from babbit or other metal capable of being cast substantially in finished form. The segments 136 have tangential end-faces between the inner tapering end portions 137 and the outer overlapping end portions 138, and have peripheral lugs 142, between which are arranged the flat springs 143. A plain circular carrier-ring 139 is employed. The tangential joints of the two packing-rings are arranged to extend in opposite directions about the rod, as in the first-described form of my packing, and relative circumferential movement of the rings is prevented by the following means: At the adjoining sides of the packing-rings there is provided on each segment a chordally extending guide-tongue 50 and a groove 51 alined with and of slightly greater length than said tongue, the groove and tongue being at right angles with the tangential face of the tapering inner end of the segment. In the assembled structure the tongues on the segments of each packing-ring fit slidably within the grooves of the segments of the other ring, as shown clearly in Fig. 11. By the arrangement of the interengaging tongues and grooves in this manner, the closing of each ring, during use and wear of the packing, proceeds without interfering with the similar closing of the other ring, each interengaged pair of segments moving inward symmetrically, and the adjacent ends of their tongues 50 approaching each other until at the limit of wear of the packing said adjacent ends of the tongues come into contact with each other and prevent further closing of the ring.

The modified form of my packing shown in Figs. 12 and 13 is suitable for use on stationary engines and the like, where the packing is not subject to fouling by cementitious material, lubrication is uniform and dependable, and the packing is usually made of cast-iron or other metal which requires machine-finishing of the segments. In this form of the packing the tangential faces of the segments 236, between the inner tapering end portions 237 and the outer overlapping end portions 238, have the same arrangement as those of the last-described form of the packing. The segments 236 are grooved peripherally to receive annular coil springs 39, which are employed in place of the carrier-ring and flat springs of the preceding forms. The segments of both packing-rings have in their adjoining sides chordal grooves extending at right angles to the tangential faces of the tapering inner end portions 237, and a guide-key is fixedly secured in the groove of one segment of each pair, said key fitting slidably in the groove of the other segment. The closing of the segments upon the rod proceeds in the same manner as in the preceding form, wherein the guide-tongues are formed integrally with the segments.

In Figs. 12 and 13, there are shown in the adjoining pairs of segments small holes 53, and in the original form of the packing-rings said holes are alined with each other to receive pins by which the segments are held in fixed relation to each other during the boring of the rings to fit upon the rod on which the packing is to be used. The pins are removed after the boring operation, and during use of the packing the closing movements of the segments cause the holes to pass out of register with each other. Should it be desired at any time, however, to re-bore the packing and fit the same upon a larger rod, the holes 53 may be replaced in alinement with each other, and the pins inserted to hold the segments in their original relation during such re-boring operation. The previously described forms of my packing may, if desired, be provided with the same means for maintaining the relative positions of the segments during boring and re-boring operations thereon.

Now, having described my invention, what I claim and desire to secure by Letters Patent is:

1. In a metallic rod-packing, a pair of adjoining packing-rings each comprising a plurality of segments having parallel side-faces and contacting plane-surfaces end-faces, the latter extending substantially tangent to the bore of the ring, whereby each segment has a tapered inner end portion and an undercut outer end portion overlapping the tapered inner end of the adjoining segment, and chordal guide-portions on each segment of the rings, said chordal guide-portions of both rings being slidably connected to prevent relative circumferential movement of said rings and to control closing movements of the segments toward the bore of the rings.

2. In a metallic rod-packing, a pair of adjoining packing-rings each comprising a plurality of similar segments having contacting plane end-faces extending substantially tangentially of the bore of the ring, each segment having a chordal guide-face thereon, and a carrier-ring disposed about said packing-rings and having chordal inner portions engaged by said guide-faces of the segments, said chordal guide-face of each segment being so related to the tangential end-faces of the respective segment as to enable closing movement of said segment while its guide-face maintains contact with the chordal portion of the carrier-ring.

3. In a metallic rod-packing, a packing-ring comprising a plurality of similar segments having contacting end-faces extending substantially tangent to the bore of the ring, said tangential end-faces of each segment having an acute dihedral angular relation, each segment having a chordal guide-face parallel to a plane bisecting the dihedral angle of the end-faces, and a carrier-ring disposed about the packing-ring and having chordal portions slidably engaged by said guide-faces of the segments.

4. In a metallic rod-packing, a pair of adjoining packing-rings each comprising a plurailty of segments having contacting end joint-faces extending substantially tangent to the bore of the ring, whereby one end of each segment overlaps the end of the adjoining segment of the ring, each segment having thereon a chordally extending guide-portion; said chordal guide-portions of both rings being slidably interconnected to prevent relative circumferential movement of said rings, to control closing movement of the segments toward the bore of the rings, and to prevent further closing of the segments after a predetermined maximum wear thereof.

5. In a metallic rod-packing, a packing-ring having parallel sides perpendicular to the bore thereof and having a plurality of flat joints extending substantially tangent to the bore and dividing the ring into a plurality of similar segments each having a tapered inner end and an outer end overlapping the tapered inner end of an adjoining segment, each segment having a chordal guide-face on the outer end thereof, and a carrier-ring disposed about said packing-ring and having chordal inner faces slidably engaged by said guide-faces of the segments, said chordal faces of the carrier-ring and segments arranged to maintain contact throughout closing movement of the segments toward the bore of the ring, and the carrier-ring having portions engageable by the outer ends of the segments to limit the closing movement thereof.

6. In a metallic rod-packing, a packing-ring comprising a plurality of similar segments having parallel side-faces and flat joint-faces extending substantially tangent to the bore of the ring, whereby each segment has a tapering inner end portion and an undercut outer end portion overlapping the tapering inner end portion of an adjoining segment, each segment having a chordal guide-face on said outer end portion thereof, said guide-face extending at an angle to the adjacent joint-face substantially half of the angle between the two joint-faces of the segment, and a rigid carrier-ring disposed about said packing-ring and having chordal inner portions engaged by the guide-faces of the segments.

7. A structure as set forth in claim 6, including springs disposed within the carrier-ring between the chordal portions thereof and retained circumferentially thereby and engaging the respectively adjacent segments of the packing-ring.

8. In a metallic rod-packing, a pair of adjoining packing-rings having parallel sides perpendicular to the bore thereof, each packing-ring comprising a plurality of similar segments of which the end-faces extend tangentially of the bore of the ring, said tangential end-faces in one packing-ring extending oppositely of those in the other packing-ring, each of the segments having thereon a chordal guide-portion, and chordally extending members engaged respectively by the guide-portions of adjoining segments of both packing-rings.

9. In a metallic rod-packing, a pair of adjoining packing-rings having parallel sides perpendicular to the bore thereof, each packing-ring comprising a plurality of similar segments having contacting end-faces extending substantially tangent to the bore of the ring, said tangential end-faces in one packing-ring extending oppositely of those in the other packing-ring, each of the segments having at one end thereof an outer chordal guide-face arranged relatively to the adjacent tangential end-face at an angle substantially half of the angle between said adjacent end-face and the other end-face of the segment, and a carrier-ring disposed about said pair of packing-rings and having chordal portions each slidably engaged by the guide-faces of a pair of adjoining segments of the two packing-rings.

10. In a metallic rod-packing, packing-rings each comprising a plurality of similar segments having parallel side-faces and having end-faces extending substantially tangent to the bore of the ring, whereby each segment has a tapering inner end portion and an outer end-portion overlapping the inner end portion of an adjoining segment, each segment having on the outer end portion thereof a chordal guide-face substantially parallel to a plane bisecting the dihedral angle of the tangential end-faces of the segment, and a carrier-ring disposed around said packing-rings and having chordally extending inner faces engaging the several guide-faces of the segments of the packing-rings.

JOHN BADEKER.